United States Patent Office 3,170,514
Patented Feb. 23, 1965

3,170,514
AQUEOUS DISPLACEMENT OF OIL
Robert R. Harvey and Emery M. Craighead, Bartlesville, Okla., assignors to Phillips Petroleum Company, a corporation of Delaware
No Drawing. Filed Oct. 22, 1962, Ser. No. 232,286
13 Claims. (Cl. 166—9)

This invention relates to an improved method or process for recovering oil from a subterranean oil-bearing stratum by displacement with an aqueous flooding agent and to improved aqueous flooding agents.

The recovery of oil from oil reservoirs, particularly after primary production has terminated, by water flooding has become prevalent in the petroleum industry. The water flooding agent is injected thru one or more wells in the reservoir and the displaced oil and water are recovered thru one or more wells therein. Various well patterns are utilized in this type of recovery. It is common practice to add surfactive agents which affect the wettability of the rock or sand in the reservoir as well as the interfacial tension between the oil and the displacing water.

This invention is concerned with improved aqueous displacing and flooding agents and methods of displacing oil from an oil reservoir, using same.

Accordingly, it is an object of the invention to provide improved aqueous displacing agents for the recovery of oil from oil-bearing formations. Another object is to provide an improved method of recovering oil from an oil reservoir by displacement with improved aqueous displacing fluids. Other objects of the invention will become apparent upon consideration of the accompanying disclosure.

Aqueous solution of salts of fatty acids, salts of alkyl sulfonic acids, and salts of alkyl sulfates exhibit the property known as micelle formation. At low concentrations of the order of $10^{-3}$ molar, these compounds form true solutions, but above a certain concentration the ions containing the alkyl group aggregate to form particles of a colloidal nature known as micelles. The concentration is referred to as the critical micelle concentration (CMC) and ranges from $10^{-1}$ to $10^{-3}$ molar for alkyl groups in the $C_8$ to $C_{18}$ range.

The presence of these micelles in the flooding water during oil recovery by water flood aids the recovery in several ways which are described below.

The micelles are colloidal particles. The use of colloidal suspensions in conjunction with surfactant additives in water floods provides a large colloid surface which presents a competitive adsorption site for surfactant molecules, thus enabling more surfactant to be present at the oil-water interface and such oil-water-rock contacts to aid in altering the surface properties to further the displacement of oil. The unique feature of this technique is that using the additive in the micelle forming state provides a "built-in" colloidal particle.

In addition to altering interfacial tensions and contact angles, the presence of the additive molecules at the oil-water interface forms solid films which increase oil recovery efficiency apparently by reducing the mobility of the aqueous flooding fluid. Again the unique feature is the "built-in" colloidal particle which insures that the film forming agents reach the oil-water interface.

The micelles apparently pick up and retain appreciable amount of the oil with which they come into contact in the reservoir. In a tertiary recovery operation this oil constitutes oil which could not be displaced by normal water flood. Such oil is carried along with the flood water and produced in an essentially miscible state with the water or aqueous flood liquid. By contacting this micelle-containing solution, and its included oil with a suitable oil-wet solid such as an organic resin or organic substituted clays, at the surface, the oil is released from the micelle and the additive is then freed for reuse.

In many cases the calcium compounds of the above groups of salts have relatively low solubility in water. To illustrate, calcium dodecyl sulfate added to flood water in a concentration in the range of 1 to $10^{-2}$ molar between the CMC and the cloud point at reservoir temperatures increases the oil recovery efficiency during a flooding operation by the "colloidal competition" and "micelle inclusion" methods described above. However, the solubility of calcium dodecyl sulfate in water is quite limited, it being only 0.2 gram per 100 grams of water at 50° C. and considerably lower at lower temperatures. In using this compound it is desirable to increase the concentration thereof in the flood water and or prevent precipitation in the event of super-saturation. It has been found that the inclusion of sodium dodecyl sulfate in the aqueous flooding agent along with the calcium dodecyl sulfate greatly increases the solubility of the latter. The addition of 0.2 gram/100 grams of water of sodium dodecyl sulfate increases the solubility of calcium dodecyl sulfate therein by nearly six fold, at 50° C. Proportionately higher increases in the solubility of the calcium compound are achieved by the addition of larger amounts of the sodium compound.

Thus the invention comprises an improved flooding agent consisting principally of water and containing a micelle forming concentration of a calcium salt of one of the group consisting of fatty acids, alkyl sulfonic acids and alkyl sulfates wherein the alkyl group includes from 8 to 18 carbon atoms and an alkali metal salt of the same group member having 8 to 18 carbon atoms in the alkyl group, the concentration of the calcium compound being in the range of 1.5 to $10^{-2}$ molar and the concentration of the alkali metal compound being in the range of 0.05 to 0.5 gram per 100 grams of $H_2O$. Processwise, the invention comprises injecting the foregoing aqueous flooding liquid into an oil-reservoir thru a well therein so as to displace oil therefrom and continuing the injection of said liquid so as to produce the aqueous liquid and displaced oil thru a well in the reservoir.

It is preferred to utilize an alkali metal salt, particularly sodium or potassium, corresponding to the calcium salt, i.e., having the same number of carbon atoms in the alkyl group or having the same alkyl group. Thus, when utilizing calcium hexadecyl sulfate the corresponding potassium or sodium hexadecyl sulfate is preferably utilized, as illustrated below. Apparently the micelles of both salts aggregate and the alkyl ions form better aggregates or micelles when they are the same or very nearly the same in size. However, this does not means that the use of the sodium or potassium salt having a substantially different number of carbon atoms in the alkyl group is not advantageous when compared to the use of the calcium salt alone. Nevertheless, better micelle formation is effected when the calcium and alkali metal salts contain alkali groups of the same size. It is preferred to utilize calcium and alkali metal salts in which the number of carbon atoms in the alkyl groups of the two salts do not vary by more than one carbon atom. This means that the alkali metal salt should have an alkyl group with the same number of carbon atoms or one more or one less carbon atom than the alkyl group of the calcium salt for best micelle formation and oil displacing properties.

Illustrative of the alkyl groups within the scope of the invention are the octyl, decyl dodecyl, hexadecyl, octadecyl, radicals, etc. It is preferred to use compounds containing normal alkyl groups but branched chain alkyls are operable.

The calcium and alkali metal salts of the fatty acids are well known soaps. The calcium soaps have relatively low solubility but also have lower CMC and the sodium soaps increase the solubility thereof so as to bring the concentration within the required range for micelle formation. Soaps within the scope of the invention include calcium and sodium oleates, laurates, palmitates, stearates, caprylates, caprates, and myristates.

Certain modifications of the invention will become apparent to those skilled in the art and the illustrative details disclosed are not to be construed as imposing unnecessary limitations on the invention.

We claim:

1. In a process for producing oil from an oil-bearing stratum comprising injecting an aqueous flooding liquid into said stratum thru a well therein so as to displace oil therefrom and producing said aqueous liquid and displaced oil thru a well in said stratum, the improvement comprising incorporating in solution in said liquid, in micelle forming concentration in the range of 1.5 to $10^{-2}$ molar, compound A selected from the group consisting of the calcium salts of fatty acids, the calcium salts of alkyl sulfonic acids, and the calcium salts of alkyl sulfates wherein the alkyl group contains from 8 to 18 carbon atoms and compound B, an alkali metal salt of the same group member and having the same number of carbon atoms as compound A in a concentration in the range of 0.05 to 0.5 gram per 100 grams of $H_2O$ in said liquid, said compounds A and B being added to the flooding liquid before injection.

2. The process of claim 1 wherein the alkali metal is Na.
3. The process of claim 1 wherein the alkali metal is K.
4. The process of claim 1 wherein the alkyl group is dodecyl.
5. The process of claim 4 wherein the alkali metal is Na.
6. The process of claim 1 wherein compound A is a calcium alkyl sulfate and the alkali metal is Na.
7. The process of claim 6 wherein compound A is calcium dodecyl sulfate.
8. The process of claim 1 wherein compound A is a calcium alkyl sulfonate.
9. The process of claim 8 wherein the alkyl group is dodecyl.
10. The process of claim 1 wherein compound A is a calcium soap.
11. The process of claim 10 wherein said calcium soap is calcium palmitate.
12. In a process for producing oil from an oil-bearing stratum comprising injecting an aqueous flooding liquid into said stratum thru a well therein so as to displace oil therefrom and producing said aqueous liquid and displaced oil thru a well in said stratum, the improvement comprising incorporating in solution in said liquid in micelle forming concentration in the range of 1.5 to $10^{-2}$ molar, compound A, selected from the group consisting of the calcium salts of fatty acids, the calcium salts of alkyl sulfonic acids, and the calcium salts of alkyl sulfates wherein the alkyl group contains from 8 to 18 carbon atoms and compound B, an alkali metal salt of the same group member as compound A and having from 8 to 18 carbon atoms in the alkyl group in a concentration in the range of 0.05 to 0.5 gram per 100 grams of $H_2O$ in said liquid, said compounds A and B being added to the flooding liquid before injection.
13. The process of claim 12 wherein said compound B has not more than 1 more and not more than 1 less carbon atom than compound A.

References Cited in the file of this patent
UNITED STATES PATENTS

| 2,747,670 | King et al. | May 29, 1956 |
| 2,792,894 | Graham et al. | May 21, 1957 |